Figure 1:

United States Patent [19]

Duyzings et al.

[11] 4,340,723

[45] Jul. 20, 1982

[54] PROCESS FOR THE PREPARATION OF A COPOLYMER OF α-METHYLSTYRENE

[75] Inventors: Wilhelmus G. Duyzings, Born; Jozef L. M. van der Loos, Sittard; Jan Tijssen, Geleen, all of Netherlands

[73] Assignee: Stamicarbon, B.V., Geleen, Netherlands

[21] Appl. No.: 218,452

[22] Filed: Dec. 19, 1980

[30] Foreign Application Priority Data

Jan. 19, 1980 [NL] Netherlands .......................... 8000355

[51] Int. Cl.$^3$ .............................................. C08F 6/22
[52] U.S. Cl. .................................... 528/497; 526/342; 528/491
[58] Field of Search ....................... 528/497, 491, 498

[56] References Cited

U.S. PATENT DOCUMENTS

| | | | |
|---|---|---|---|
| 3,108,983 | 10/1963 | Barclay | 528/490 X |
| 3,668,195 | 6/1972 | Van Der Geer | 528/489 X |
| 3,761,455 | 9/1973 | Tanaka | 528/490 X |
| 3,875,104 | 4/1975 | Siegele | 528/490 X |
| 4,001,486 | 1/1977 | Phillips | 528/492 |
| 4,025,711 | 5/1977 | Davidson | 528/488 |

Primary Examiner—C. A. Henderson
Attorney, Agent, or Firm—Cushman, Darby & Cushman

[57] ABSTRACT

An improved process for the preparation of copolymers of α-methylstyrene and other co-monomers such as acrylonitrile styrene, methyl methacrylate and the like, wherein a substantially water-immiscible softener is employed, particularly prior to coagulation of the latex formed of the copolymer, whereby an improved product of higher bulk density and easier to employ in a subsequent processing is obtained.

7 Claims, 2 Drawing Figures

FIG. I

PROCESS FOR THE PREPARATION OF A COPOLYMER OF α-METHYLSTYRENE

The invention relates to a process for the preparation of a copolymer of α-methylstyrene with one or more other monomers, optionally in the presence of a rubber, by aqueous emulsion polymerization with formation of a polymer latex, subsequently coagulating the latex and then recovering and drying the polymer.

It is already known that in the emulsion polymerization to form copolymers of α-methylstyrene with one or more other monomers, such as acrylonitrile, styrene, methylmethacrylate, and the like, polymer latices are formed which are difficult to coagulate. The consequence among other things is that the recovery of the polymer powder from the water, the drying of the polymer and the further processing thereof to granulate will also present problems.

The Italian patent specification 715,646 describes the preparation in emulsion, with successive coagulation, of a copolymer of α-methylstyrene and acrylonitrile. According to this patent specification, the latex is coagulated under pressure, by addition of $CaCl_2$, at temperatures of about 110° C., preferably at 115°–125° C. Disadvantages of this method are that pressure-proof equipment must be used, while, prior to further processing, the coagulated latex must also be cooled. In this cooling process, the equipment will generally become fouled.

The purpose of the invention is, therefore, to provide a process for the preparation of a co-polymer, of α-methylstyrene, in which process these disadvantages are avoided.

The present invention is particularly characterized by effecting the coagulation in the presence of a softener for the copolymer of α-methylstyrene, which softener is substantially insoluble in or immiscible with water, and which has a boiling point lower than the boiling point of α-methylstyrene.

As softener, a solvent for the copolymer of α-methylstyrene, substantially immiscible with water, is preferably used. More specifically, one or more compounds from the groups of benzene, toluene, xylene, cyclohexane, ethylbenzene and lower aliphatic chlorinated hydrocarbons, such as 1,1,1-trichloroethane and tetrachloromethane are selected for this purpose. Surprisingly, it has been found that by employing the process according to the invention, there are none or hardly any problems during the coagulation of the polymer or during the successive recovery, drying and granulation thereof.

In particular, in this way it is possible to achieve coagulation at relatively low temperature, with the addition of chemicals, or even by "freezing out", so that no pressure-proof equipment is required, while in the case of coagulation by the addition of chemicals, even cooling of the coagulated latex can be dispensed with.

The polymerization is effected in an aqueous emulsion. The usual quantities of water, emulsifiers, regulators, polymerization initiators, pH regulators and other additives can be used in this preparation process in the manner already known to those skilled in the art. The monomer concentration during the polymerization is preferably 20 to 50% by weight, which means that 400 to 100 parts by weight of water per 100 parts by weight of monomers are used.

Examples of suitable emulsifying agents include the following: Sodium salts, potassium salts and ammonium salts of fatty acids with a chain length of from 10 to 20 carbon atoms, alkyl sulphates with from 10 to 20 carbon atoms, alkyl sulphonates with from 10 to 20 carbon atoms, alkylaryl sulphonates with 10 to 20 carbon atoms and rosin acids (for instance, derivatives of abietic acid).

For adjusting the molecular weight to the desired value, substances functioning as regulators can be used, for instance, long chain mercaptans, such as dodecyl mercaptan and octyl mercaptan.

As polymerization initiators, per-inorganic or per-organic compounds or azo compounds can be used, such as potassium or ammonium persulphate, ditertiary butyl hydroperoxide, cumene hydroperoxide, or azodi-isobutyronitrile. Redox systems of the per compounds mentioned with reducing agents can also be used, particularly acids of sulphur with a low valency stage, such as formaldehydesulphoxylate, and bases, such as triethanolamine.

As pH regulators, salts of orthophosphoric acid or pyrophosphoric acid can, for instance, be added for the acid range, as well as caustic soda and the like for the basic range. The polymerization can be carried out at a pH of from 2 to 13, but is preferably carried out at a pH of from 7 to 12, depending upon the emulsifying agent used. The polymerization temperature can be from 20° to 120° C., preferably from 40° to 90° C.

The copolymers of α-methylstyrene to be prepared according to the invention are copolymers of α-methylstyrene with one or more other monomers. Examples of such monomers are acrylonitrile, methacrylonitrile, methyl methacrylate, ethyl acrylate and styrene. It is also possible, as copolymer of α-methylstyrene, to prepare a copolymer in the presence of a latex of a rubber, such as polybutadiene, butadienestyrene rubber, butadiene-acrylonitrile rubber, polychloroprene, acrylate rubber, ethylenepropylene rubber and/or EPDM rubber.

By preference acrylonitrile is used as comonomer, optionally together with styrene.

The specific coagulation method depends on the emulsifier used. If an anionic or cationic emulsifier has been used (i.e., and emulsifier active only in a certain pH range), the coagulation can be effected by changing the pH of the latex.

When using emulsifiers which are inactive with higher electrolyte concentrations, the latex can be coagulated by the addition of suitable electrolytes, such as calcium chloride.

After coagulation, the coagulated latex is separated from the aqueous phase, washed and subsequantly dried. The polymer powder obtained can then be further processed to granulate.

The exact quantity of softener added according to the present invention is not particularly critical. The quantity will preferably be kept as small possible in order to minimize the costs and to keep the softener content of the polymer as low as possible.

By preference, the amount of softener used will be between 0.1, preferably at least 0.25% and 5% by volume in relation to the total latex, more specifically, an advantageous amount is from 0.25 to 2% volume for best results.

Preferably, the softener is added shortly before the coagulation, in which procedure care should be taken that the contact time of the polymer with the softener is between 0.1 and 600 seconds. More specifically, a contact time of about 60 seconds at most is preferred.

In this connection, contact time is understood to mean the time which elapses between the addition of the softener and commencement of the coagulation. The latter moment is generally determined by the addition of the electrolyte or of the reagent regulating the pH. If coagulation is effected by cooling, the moment at which the latex starts to coagulate should be used for the calculation of the contact time.

It has been found that, specifically with very short contact times, good coagulation is possible, so that optimum processing conditions are obtained. Moreover, it has been found that with short contact times, only the outside of the polymer particle will soften so that the softener will not penetrate deep into the polymer particles. During the drying of the polymer, the softener is therefore easy to remove.

For the invention, it is essential that the boiling point of the softener, which is understood to mean the boiling point of the compound itself or the boiling point of a possible azeotrope with water, is lower than the boiling point of α-methylstyrene (163.4° C., 101 kPa). The fact is that if a softener with a higher boiling point is chosen, problems will later arise with the removal of these compounds from the polymer powder during the drying.

The use of a softener substantially insoluble or immiscible in water is necessary, because it has surprisingly been found that, with the use of softeners soluble in water, the polymer will prematurely separate from the latex in a form which excludes further processing.

In this connection, the expression "insoluble or immiscible in water" is understood to mean that with the quantities used according to the invention, at least part of the softener present will exist as a separate phase.

The resulting copolymers of α-methylstyrene are applied particularly for purposes of improving the heat resistance of other plastics, specifically plastics containing styrene, such as ABS. In addition, the copolymer product is also employed as such, for instance, in making domestic and/or electrical appliances, or in the automobile industry.

EXAMPLES I–IV AND COMPARATIVE EXAMPLE A

An aqueous latex consisting of 70% by weight of water and 30% by weight of copolymer of α-methylstyrene and acrylonitrile in a weight ratio of 70:30, with a free-monomer content less than 0.5% by weight, was prepared on the basis of an emulsion of α-methylstyrene and acrylonitrile in water, using "rosin soap" or "disproportionated wood rosin" as the emulsifier.

In a first series of tests the effect of the quantity of softener was examined. This was done by allowing the latex to be in contact with toluene for a fixed period of 600 seconds prior to effecting the coagulation with acid addition. The boiling point of toluene at 100 kPa is 100° C. In Table 1, each example shows the percentage by volume of toluene and the resulting bulk density of the polymer powder. The fact is that the level of the bulk density of the polymer after recovery and drying has been found to be a measure for the manner in which the coagulation process has proceeded and for the ease of further processing. The higher the bulk density, the better the polymer can be processed, i.e., the easier the polymer particles are separated from the water, the faster and better the polymer can be dried and the better the polymer can be granulated or otherwise shaped. A high bulk density has the additional advantage that the transport storage and processing is more economic.

The higher the bulk density, the better the polymer can be processed.

In case of a copolymer of α-methylstyrene and acrylonitrile, when the bulk density is below about 300 kg/m³, various problems will be encountered, in the coagulation, in the recovery of the polymer powder from the water, and/or in the drying and the further granulation, thereof.

TABLE 1

| Example | Toluene Vol. % | Bulk Density kg/m³ |
|---|---|---|
| A | — | 210 |
| I | 0.2 | 220 |
| II | 0.5 | 340 |
| III | 1 | 480 |
| IV | 2 | 490 |

EXAMPLES V–VIII AND COMPARATIVE EXAMPLE B

In a second series of experiments, a latex the same as that of the preceding examples was prepared, on which the effect of the contact time at constant toluene quantity (1% by volume) was examined. Table 2 shows the results. It also includes the % by weight of toluene in the dried polymer.

TABLE 2

| Example | Contact Time sec. | Bulk Density kg/m³ | Toluene In Polymer Powder wt. % |
|---|---|---|---|
| B | 0* | 210 | — |
| V | 60 | 440 | 0.09 |
| VI | 300 | 480 | 1.18 |
| VII | 1800 | 480 | 0.99 |

*This means that the toluene and the acid were added simultaneously.

These experiments clearly show that, already with very short contact times, a very good result is reached, while the softener content of the end product yet continues to be low.

EXAMPLES IX AND X

In the same way as in Example V a latex was prepared of a copolymer of α-methylstyrene and acrylonitrile, to which 1.0% by volume of toluene or 1,1,1-trichloroethane was added. The results are mentioned in Table 3.

TABLE 3

| Example | Softener | Boiling Point °C. | Bulk Density |
|---|---|---|---|
| XI | Toluene | 110 | 410 kg/m³ |
| X | 1,1,1-trichloroethane | 74.1 | 350 kg/m³ |

COMPARATIVE EXAMPLE C

To 100 grams of powder of copolymer of α-methylstyrene and acrylonitrile with a bulk density of 230 kg/m³, obtained by coagulating a latex prepared in the same way as that of Example A (without addition of a softener), 500 ml water and 1.5 g emulsifier were added. A stable latex was formed in this way, and was then mixed with 1% by volume of toluene. After a contact time of 1 minute, the latex was coagulated, and the bulk density of the product was determined after drying of the powder. This bulk density was 230 kg/m³. This example illustrates that the effect of the invention is not realized when the softener is added after the coagulation.

The foregoing examples and comparative examples clearly show, however, that in applying the method according to the invention, a product is obtained with a definitely higher bulk density.

COMPARATIVE EXAMPLES D AND E (Use of a Water Soluble Softener)

In the same way as in Example V, a latex of a copolymer of α-methylstyrene and acrylonitrile was prepared. To this latex, 1% by weight of butanone was added. Immediately after addition of the butanone to the latex, the polymer separated out as a shapeless, sticky substance.

The use of 1% by weight of propanone gave the same result.

Examples D and E are illustrative of the observation that using softeners soluble in water, such as propanone and butanone, will not achieve the results of the process according to the present invention.

Figure 2:
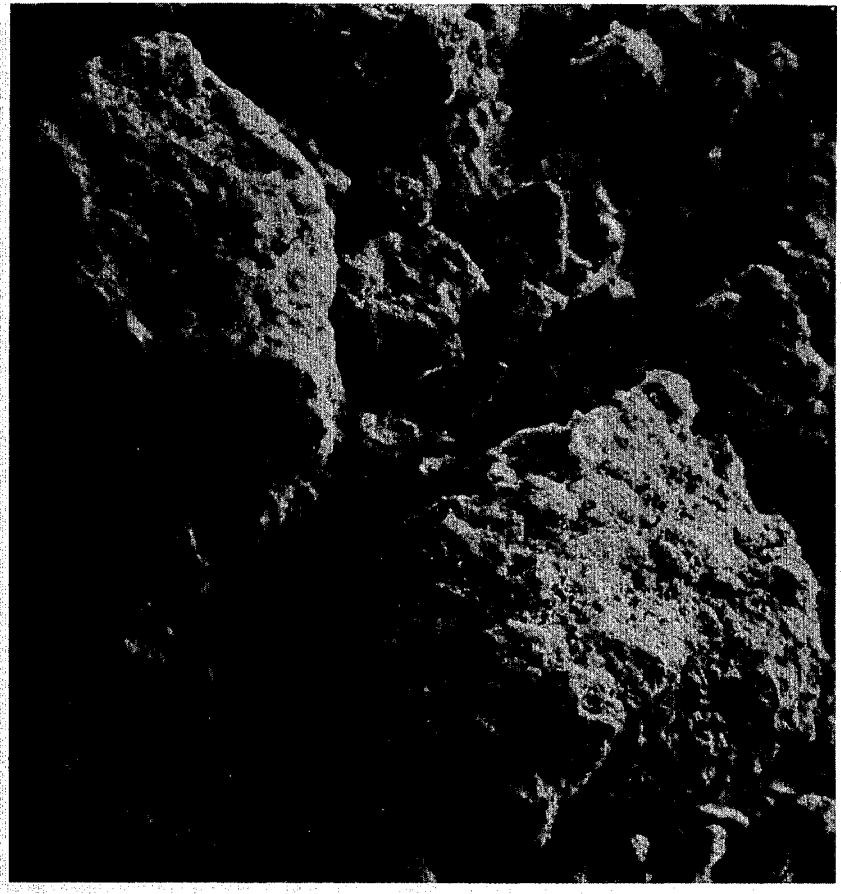

As further illustrative of the invention, the accompanying electronmicroscope photographs, (550× enlarged) illustrate the coagulated powder obtained from certain of the above Examples. FIG. 1 is from Example 5 and, FIG. 2 is from Example A. As may be seen from the photographs, the nature, shape and/or form of the coagulated powder can be seen, and the difference thereof between the several Examples. From these photographs, one skilled in the art can also perceive that the use of the method of the present invention results in the observed prior bulk densities as a result of the effect of the process on the formation of the coagulated particles.

Accordingly, it would be understood and appreciated by those skilled in the art from the foregoing Examples and description of the specification that the invention may be practiced in various ways within the spirit and scope thereof, and is limited only by the following claims.

What is claimed is:

1. In processes for the preparation of copolymers of α-methylstyrene and at least one other monomer of the group acrylonitrile, methacrylonitrile, methyl-methacrylate, ethylacrylate and styrene, by aqueous emulsion copolymerization, to form a copolymer latex, and followed by coagulating the latex and recovering and drying the polymer thereby formed, the improvement in combination with said copolymerization wherein said coagulation is effected in the presence of a softener agent for said copolymer of α-methylstyrene, said softener being a solvent for said copolymer and substantially immiscible with water, and having a boiling point below that of the boiling point of α-methylstyrene.

2. The process according to claim 1, wherein said softener, a compound is selected from the group of monocyclic aryl and alkaryl hydrocarbons, lower cycloalkyls, and lower saturated aliphatic chlorinated hydrocarbons.

3. The process according to any one of the claims 1 or 2, wherein the softener is added to the latex prior to effecting the coagulation.

4. The process according to any one of the claims 1 or 2, wherein the contact time of the softener and the latex prior to coagulation is between 0.1 and 600 seconds.

5. The process according to any one of claims 1 or 2, wherein from 0.1 to 5% by volume of softener in relation to the latex is added.

6. The process according to any one of claims 1 or 2, wherein from 0.25 to 5% by volume of softener in relation to the latex is added.

7. The process according to any one of claims 1 or 2, wherein from 0.25 to 2% by volume of softener in relation to the latex is added.

* * * * *